US012311408B2

(12) United States Patent
Boothe et al.

(10) Patent No.: US 12,311,408 B2
(45) Date of Patent: May 27, 2025

(54) FLEXIBLE SCREEN DECK

(71) Applicant: Johnson Crushers International, Inc., Eugene, OR (US)

(72) Inventors: Wills Boothe, Eugene, OR (US); Brian Nicholas Becker, Yankton, SD (US)

(73) Assignee: Johnson Crushers International, Inc., Eugene, OR (US)

( * ) Notice: Subject to any disclaimer, the term of this patent is extended or adjusted under 35 U.S.C. 154(b) by 0 days.

(21) Appl. No.: 18/604,594

(22) Filed: Mar. 14, 2024

(65) Prior Publication Data

US 2024/0307921 A1 Sep. 19, 2024

Related U.S. Application Data

(60) Provisional application No. 63/490,024, filed on Mar. 14, 2023.

(51) Int. Cl.
*B07B 1/28* (2006.01)
*B07B 1/48* (2006.01)

(52) U.S. Cl.
CPC . *B07B 1/28* (2013.01); *B07B 1/48* (2013.01)

(58) Field of Classification Search
CPC .... B07B 1/28; B07B 1/48; B07B 1/42; B07B 1/46
See application file for complete search history.

(56) References Cited

U.S. PATENT DOCUMENTS

| | | |
|---|---|---|
| 2,345,947 A | 4/1944 | Parks |
| 2,825,461 A | 3/1958 | Hannon |

(Continued)

FOREIGN PATENT DOCUMENTS

| | | |
|---|---|---|
| CN | 102069066 A | 5/2011 |
| CN | 105499122 A | 4/2016 |

(Continued)

OTHER PUBLICATIONS

Andrew Gatt, "Diagonal Supports", Nov. 2, 2021, https://www.youtube.com/watch?v=OJhfwNAiaYc (Year: 2021).*

(Continued)

*Primary Examiner* — Jacob S. Scott
*Assistant Examiner* — Miraj T. Patel
(74) *Attorney, Agent, or Firm* — Chambliss, Bahner & Stophel, P.C.; Stephen D. Adams

(57) ABSTRACT

An apparatus for providing selectable multimodal vibration in a vibratory screen assembly to filter a bulk material of varying sizes. The vibratory screen assembly includes screen deck having a rigid portion and a flexible portion. The rigid portion formed by side plates, deck ends, and stability members. The flexible portion mounts within the rigid portion and includes flexible girders and support members. The support members are attached to the flexible girders and support a screen medium fixed to the rigid portion and covering the screen deck. The flexible girders include a tensioner and are held at varying tension levels to impact the vibratory frequencies of the screen deck at various locations. The vibratory screen assembly also includes a vibration-generator to provide vibration to the assembly. When vibrated, any bulk material on the screen deck experiences a range of linear and non-linear vibrational frequencies, increasing the effectiveness of filtration.

20 Claims, 12 Drawing Sheets

(56) References Cited

U.S. PATENT DOCUMENTS

| | | | |
|---|---|---|---|
| 2,946,440 | A | 7/1960 | Simpson |
| 3,070,230 | A | 12/1962 | Peterson |
| 3,080,055 | A | 3/1963 | Verne |
| 3,468,418 | A | 9/1969 | Renner |
| 4,033,865 | A | 7/1977 | Derrick, Jr. |
| 4,062,768 | A | 12/1977 | Elliot |
| 4,122,006 | A | 10/1978 | Christensen et al. |
| 4,288,320 | A | 9/1981 | Wilson |
| 4,444,656 | A | 4/1984 | Nelson et al. |
| 4,929,346 | A | 5/1990 | Si-Lin |
| 5,203,460 | A | 4/1993 | Deister et al. |
| 5,232,099 | A | 8/1993 | Maynard |
| 5,248,043 | A | 9/1993 | Dorn |
| 5,301,815 | A | 4/1994 | Chauvin et al. |
| 5,341,939 | A | 8/1994 | Aitchison et al. |
| 5,456,364 | A | 10/1995 | Lambert |
| 5,542,548 | A | 8/1996 | Senapati |
| 6,062,394 | A | 5/2000 | Bielagus |
| 6,116,428 | A | 9/2000 | Loshe |
| 6,220,447 | B1 | 4/2001 | Lambert |
| 6,250,792 | B1 | 6/2001 | Krush et al. |
| 6,422,394 | B1 | 7/2002 | Page |
| 6,845,868 | B1 | 1/2005 | Krush et al. |
| 6,889,846 | B2 | 5/2005 | Olsen et al. |
| 7,413,087 | B2 | 8/2008 | Kriel |
| 7,416,085 | B2 | 8/2008 | Kadel |
| 7,571,817 | B2 | 8/2009 | Scott et al. |
| 7,694,826 | B2 | 4/2010 | Garrett et al. |
| 8,002,116 | B1 | 8/2011 | Cato |
| 8,485,364 | B2 | 7/2013 | Krush et al. |
| 8,645,868 | B2 | 2/2014 | Oguri et al. |
| 10,507,494 | B2 | 12/2019 | Sauser |
| 2007/0000817 | A1 | 1/2007 | Malmberg |
| 2014/0054216 | A1 | 2/2014 | Burnett |
| 2015/0096944 | A1 | 4/2015 | Krush et al. |
| 2018/0345321 | A1 | 12/2018 | Stroup et al. |
| 2018/0353996 | A1 | 12/2018 | Mumm et al. |
| 2019/0321855 | A1 | 10/2019 | Murphy |
| 2021/0213485 | A1 | 7/2021 | Dumbaugh |
| 2022/0008957 | A1 | 1/2022 | Abell et al. |

FOREIGN PATENT DOCUMENTS

| | | | |
|---|---|---|---|
| JP | 2018183765 | A | 11/2018 |
| JP | 2021003671 | A | 1/2021 |
| RU | 210586 | U1 | 4/2022 |

OTHER PUBLICATIONS

International Search Report and Written Opinion for PCT/US24/19830, dated Jul. 9, 2024, 16 pages.

Major Wire, FLEX-MAT high-vibration wire screens, https://www.majorflexmat.com/product/flex-mat-high-vibrating-wire-screens/, Accessed Oct. 3, 2024.

* cited by examiner

FLEXIBLE SCREEN DECK

CROSS-REFERENCE TO RELATED APPLICATIONS

This application claims the benefit of U.S. Provisional Application No. 63/490,024 filed Mar. 14, 2023, and entitled Flexible Screen Deck, which is incorporated herein by reference in its entirety.

FIELD

The present invention relates generally to a vibratory screen assembly for classifying materials by particle size. More particularly, the invention relates to an arrangement of screen medium supporting structural members that has beneficial vibration action when combined with various vibrational frequencies and bulk material interactions.

BACKGROUND

A vibratory screen assembly is a device that separates bulk materials, using one or more vibrating screen decks, based on the size of the bulk material. Each screen deck is provided with a screen medium having openings with a specified opening size. As the screen deck and associated screen medium vibrates, bulk material smaller than the openings pass through the screen medium. However, bulk material larger than the openings does not pass through the screen medium. Bulk material particles small enough to pass through the openings of a particular screen medium are often called "undersize" and, ideally, all pass through the medium. On the other hand, bulk material particles that are too large to pass through the openings of a particular screen medium are often called "oversize" and, ideally, they are all retained by (i.e., prevented from passing through) the medium. In practice, screens are rarely ideal, and their accuracy is characterized by the proportion of correctly screened oversized and/or undersized particles.

In using a vibratory screen assembly, bulk material is typically fed onto a screen deck in a continuous flow. Then, with the assistance of one or more of gravity and reciprocating motion, the bulk material is conveyed across the length of the screen. As noted above, undersized particles pass through the deck and oversized particles are retained by the deck. In some cases, several decks are arranged so that the undersized particles from one deck fall directly onto the next deck. During this process, for an undersized particle to move through the screen media, it needs to be presented to the openings in a manner that facilitates its passage through one of those openings. If an undersized particle is retained by the medium and does not pass through any of its openings, that particle is incorrectly sorted and, as a result, the efficiency of the screen is reduced. As discussed below, there are many reasons that an undersized particle might fail to correctly pass through a screen medium.

First, one common reason that an undersized particle might improperly remain on a screen medium is that it is never presented to any of the openings while being conveyed across the screen deck. This lack of opportunity often occurs when undersized particles are obstructed by other particles due to insufficient stratification or where the bed depth (i.e., the amount of bulk material placed onto the screen deck) is too great. In other cases, the longer particles are airborne and are not located on the screen deck, the lower the chance they engage with the screen medium. In other cases, an undersized particle might fail to pass through one of the openings because it attaches to other particles to form an agglomeration (i.e., a clump of particles) larger than the screen media opening.

Next, a particle may be "near-size," meaning the particle is approximately the same size as the openings of a screen medium. Typically, near-size particles require many media presentations, which can limit the percentage of near-size particles that pass through a screen. Finally, undersized particles might also fail to correctly move through a screen medium due to "blinding." Blinding occurs when the openings of a screen medium become clogged due to particles building up and bridging over the openings. Factors exacerbating blinding include, but are not limited to, particle size distribution, particle porosity, clay content, particle shape, moisture content, media properties, and the motion of the media. The motion of the media, also known as the "media action," is more easily adjusted than at least some of the other factors discussed above. For this reason, media action is of particular interest in the present disclosure.

Media action-often defined as the location of the medium elements in space and time-influences several screening objectives including the bulk material's de-agglomeration, conveyance speed, stratification, and separation. Media action also influences the media's tendency to blind. Optimizing media action to achieve a particular objective (e.g., increased conveyance speed) may not optimize the media action for other objectives (e.g., de-agglomeration). Therefore, a vibrating screen assembly producing a media action that performs well in each of the critical screen objectives is desirable.

Prior attempts related to media action include U.S. Pat. No. 6,889,846, entitled "Hybrid Screen," which proposes devices capable of changing media action and angle of inclination along the flow of the screen to provide areas of higher stratification and conveyance preceding areas of accurate separation. While it may be beneficial to adjust the media action along the length of the screen, such a hybrid screen can only promote one frequency of vibration for the entire vibrating screen assembly.

U.S. Pat. No. 5,542,548, entitled "Fine Mesh Screening," alternatively proposes the use of media action that is comprised of at least two frequencies, known as multi-frequency, since the unique frequencies can be selected to achieve multiple objectives. Although such multi-frequency assemblies have performance advantages, especially for bulk material prone to blinding, the multitude of vibration assemblies required, and the resulting maintenance makes these arrangements undesirable.

Next, U.S. Pat. No. 6,845,868, entitled "Multifrequency vibratory separator system, a vibratory separator including same, and a method of vibratory separation of solids," proposes converting low-frequency excitation to broad spectrum, multi-frequency vibration. This is achieved by one or more multi-frequency converters that are passive and deliver non-linear shock impulses directly to a screen's media. However, this system requires an intermediary substrate to convey the vibration across the media surface. It would be beneficial if a system could convert low-frequency vibration to broad spectrum multi-frequency vibration without the need for an intermediary substrate.

Furthermore, in practice, it has been found that media action is not so easily measured or controlled since it may vary across the surface of the medium and it is determined by multiple factors including the action of the medium supporting structure (or supporting members), the medium's flexural response to the action of the medium supporting structure, and the medium's flexural response to the force from the bulk material that has been loaded onto the screen deck. Further, the medium's total response from these factors depends on how the medium is arranged, tensioned, and supported on the screen deck and the intrinsic mechanical properties of that medium.

Some media systems leverage structural dynamics to prevent or reduce blinding by arranging the media such that portions of the media located between media supports have increased media action. In certain of those cases, increased media action occurs when media systems are tuned to respond to inertial body loads from the overall screen action or non-linear impact loads from bulk material. For this reason, such systems are often called "tuned" media systems. One example of a tuned media system designed to respond to inertial body loads is described in U.S. Patent Publication No. 2019/0321855, entitled "Screening Apparatus with Improved Screen Media," wherein finger rods have a natural vibrating frequency that is higher (i.e., by several Hertz) than the operating frequency of the media system, which causes the rods to flex slightly and increases the action of the finger rod, especially at its extremity. When bulk material attaches to the rods, their natural frequency is reduced such that it is closer to the operating frequency and magnifies the response (i.e., induces resonance). The increased action tends to shed any attached bulk material from the rods and, thereby, restores the normal mode to its higher frequency.

Another example of a tuned media system designed to respond to non-linear forces imparted on the media from bulk material is the Flex-Mat® brand vibrating wire screen system developed by Major Wire. This system arranges the media such that the portions of the media that are suspended between supports have natural modes of vibration that are excited by the impact force from bulk material. The advantage of this arrangement is that the frequencies of the normal modes do not need to align with the operating frequency to be excited. However, the disadvantage of such media is that it is more expensive than woven wire, and the flexible openings necessarily result in a loss of size specification. Another disadvantage is that the increased media action only occurs at a distance from the rigid supports and, therefore, bulk material tends to build up on the openings near those media supports.

Other systems utilize media that are supported by elements that are, themselves, able to vibrate. These vibrating media supports are often called "tappets" and assemblies which utilize tappets have the benefit of focusing the vibration energy on the media itself rather than on the entirety of the assembly. Tappet-style exciters or vibrator motors are commonly used in connection with high-frequency screens such as the system described in described in U.S. Pat. No. 4,444,656, which is entitled "Classifying Apparatus and Methods." One drawback of such systems is the multitude of exciters required to excite a full deck. Another drawback of this style of screen is the requirement for steep inclination angles to convey bulk material across the length of the screen which results in high bulk material travel speeds and can lead to low near-sized efficiency since the particles do not have very many opportunities for separation.

It would, therefore, be beneficial to have a vibratory screen assembly having media support members that can support screen media and that are, themselves, capable of vibrating without the aid of exciters. Further, it would be beneficial to have a vibratory screen assembly that provides multiple normal modes of vibration at different frequencies. Preferably, at least some of the modes of operation are excited by non-linear forces imparted by the bulk material to be screened. Further, it would be beneficial if, because of the action of these frequencies, the media openings (including those of square opening wire cloth) are kept clean.

SUMMARY

The following presents a simplified summary of one or more embodiments of the invention to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing an apparatus for providing selectable multimodal vibration in a vibratory screen assembly having first and second side plates that are held in an offset parallel arrangement extending in a longitudinal direction. The apparatus may comprise a screen deck connecting the first and second side plates together. The screen deck may be formed by first and second deck sides that are held in an offset parallel arrangement extending in the longitudinal direction. The screen deck may also include a deck end connecting opposing ends of each of the first and second deck sides together. The screen deck may also include first stability members connecting the first and second deck sides together and spaced along the screen deck between the deck ends. In certain embodiments, the screen deck may further include second stability members diagonally connected between one of the deck sides and one of the first stability members. Further, a screening space is defined by the first and second deck sides and the deck ends of the screen deck. The screen deck is further formed by flexible girders extending between the deck side. The flexible girders can be selectively tensioned and un-tensioned. Additionally, the screen deck is formed by support members extending in the longitudinal direction and attached to the flexible girders. The screen deck is also formed by a screen medium extending over a top of the screen deck to cover the screening space. The screen medium may have a bottom surface that is supported by a top of the support members.

In certain embodiments, the top surface of the first and the second deck ends each form an arch wherein a top of the arch corresponds with a center of the respective deck ends. Further, the top surface of the support member may be level with a top surface of at least one of the second deck ends.

In certain embodiments, the apparatus may further comprise a tensioner for selectively tensioning the flexible girders. The tensioner may comprise a first component and a second component wherein the first component is disposed on an end of the flexible girder. Optionally, each flexible girder may be tensioned at a different tension level. In certain embodiments, the first component may be a threaded portion and the second component may be a nut threaded onto the threaded portion. The nut is sized and configured to abut an exterior surface of the deck sides. As the nut of the tensioner is tightened, tensioned is applied to a portion of the flexible girder disposed between the first and second deck sides. In certain other embodiments, the first component is a swaged button, and the second component is a tension block. The tension block may be sized and configured to capture the swaged button. The tension block may be further configured to be movable perpendicular to the deck sides along a central axis of the flexible girder. Optionally, the flexible girder may comprise a metal wire rope.

In certain embodiments of the apparatus, the support member may comprise an upper section for supporting the screen medium and a lower section or engaging with the flexible girder. The lower section includes a notch sized and configured to be placed atop the flexible girder and locate the flexible girder within the notch. The support member may be fixedly attached to the flexible girder by a clamp. The clamp may have a top portion affixed to the support member. The top portion may have a lower surface that corresponds to the notch and contacts the flexible girder. The clamp may also include a bottom portion selectively attached to the top portion. The bottom portion may have an upper surface sized and configured to contact and secure the flexible girder within the clamp when selectively attached to the top portion.

In certain embodiments, the bottom surface of the lower section of the support member is vertically offset from the stability members by a distance D1. In certain embodiments, an elastomer having a height equal to D1 is disposed between the bottom surface of the lower section and the support member. In other embodiments, a maximum deflection distance of the flexible girder is D2. D2 may be greater than D1, meaning, as the flexible girder deflects to distance D2, the bottom surface contacts the stability member. This collision creates a non-linear impact force in the screen deck. In certain embodiments, an elastomer is disposed at a point where the bottom surface contacts the support member. In certain embodiments, exciters may be mounted to the support member, the flexible girder, or both, the exciters being configured to vibrate at a specific frequency and induce vibration in the screen deck.

In certain other embodiments, the apparatus may further comprise a beater configured to deliver a non-linear impact force to the screen deck. The beater may comprise a substantially hollow body, a mass disposed within the hollow body configured to move vertically within the hollow body, and a spring disposed within the hollow body arranged to deliver an upward force on the mass.

In further embodiments, the apparatus may further comprise the vibratory screen assembly having a vibration generator affixed to the first side plate and configured to impart vibrations on the screen deck assembly. In said embodiments, the screen deck connects the first and second side plate. The apparatus may further comprise a tensioner for selectively tensioning the flexible girders. The tensioner may have a first component disposed on an end of the flexible girder and a second component. A first hole may be disposed in the first side plate and a corresponding second hole may be disposed in the first deck side and aligned with the first hole. The first end of the flexible girder passes through the first and second hole and the tensioner is accessible from an exterior surface of the first side plate. In certain embodiments, at least one end of each of the flexible girders is secured at a securing point located outside of the first or second side plates.

Also disclosed herein is a method for separating bulk material according to size. The method may include a first step of providing a bulk material comprising an aggregate of individual material, each individual material having a size. Next, a vibratory screen assembly for multimodal vibration is provided. The vibratory screen assembly has a first side plate, a second side plate at an offset distance from the first side plate and parallel to the first side plate in a longitudinal direction, and a vibration-generator affixed to the first side plate and configured to impart vibrations on the vibratory screen assembly.

The vibratory screen assembly also include a screen deck connecting the first and second side plates. The screen deck may have first and second deck sides held in an offset parallel arrangement extending in the longitudinal direction and a deck end connecting opposing ends of each of the first and second deck sides together. First stability members may connect the first and second deck sides together and are spaced along the screen deck between the deck ends. A screening space may be defined the first and second deck sides and the deck ends of the screen deck. Flexible girders may extend between the deck sides and be configured to be secured to the first and second deck sides and be further configured to be selectively tensioned and un-tensioned. Support members may extend in the longitudinal direction and be attached to the flexible girders. Finally, a screen medium may extend over a top of the screen deck to cover the screening space. The screen medium has a bottom surface supported by a top of the support members. A top surface of the support members contacts and supports a bottom side of the screen medium and a top surface of the support members at the first end is level with a top surface of the first deck end.

The method then includes the step of inducing a vibration via the vibration-generator, thereby translating the vibration to the screen deck. This results in multiple vibration frequencies being present within the screen deck at various locations on said screen deck. Next, the bulk material is placed on the screen deck. Vibration frequencies present in the screen deck are then transferred to the screen medium and the bulk material, resulting in a first size bulk material remaining on the screen deck and a second, smaller size bulk material passing through the screen deck.

In certain embodiments, the vibratory screen assembly further comprises a second screen deck disposed underneath the first screen deck. The second screen deck may have a second screen medium affixed to a top side of the second screen deck, the second screen medium being sized to permit the second size bulk material to remain on the second screen deck. A third, smaller size bulk material may pass through the second screen deck as the vibratory screen assembly vibrates. In certain other embodiments, the vibratory screen assembly includes beaters. The beaters deliver a non-linear impact to the first screen deck and the second screen deck. The method may then further include the step of delivering a non-linear impact to the vibratory screen assembly via the beater.

Notes on Construction

The use of the terms "a", "an", "the" and similar terms in the context of describing embodiments of the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic.

Terms concerning attachments, coupling and the like, such as "attached", "connected" and "interconnected", refer to a relationship wherein structures are secured or attached to one another either directly or indirectly through intervening structures, as well as both moveable and rigid attachments or relationships, unless otherwise specified herein or clearly indicated as having a different relationship by context. The term "operatively connected" is such an attachment, coupling or connection that allows the pertinent structures to operate as intended by virtue of that relationship.

The use of all examples or exemplary language (e.g., "such as" and "preferably") herein is intended merely to better illuminate the invention and the preferred embodiments thereof, and not to place a limitation on the scope of the invention. Nothing in the specification should be construed as indicating any element as essential to the practice of the invention unless so stated with specificity.

As the term is used herein, a "linear force" is defined as a force which acts on a vibrating assembly in a manner that is approximately sinusoidal such as the force imparted by a prior art unbalanced mass impulse mechanism. Such a force, when acting on a rigid mass suspended by an ideal spring, would result in a response whose frequency is the same as the forcing frequency regardless of the natural frequency of the spring-mass system.

As the term is used here, a "non-linear force" is a force that is periodic, but not sinusoidal. Shock impulses such as those that occur when two masses collide is an example of a non-linear force. Such a force, when acting on a rigid mass suspended by an ideal spring, would result in a response whose frequency would include the natural frequency of the spring-mass system.

BRIEF DESCRIPTION OF THE DRAWINGS

Further advantages of the invention are apparent by reference to the detailed description when considered in conjunction with the figures, which are not to scale to show the details more clearly, wherein like reference numerals represent like elements throughout the several views, and wherein.

DETAILED DESCRIPTION

This description of the preferred embodiments of the invention is intended to be read in connection with the accompanying drawings, which are to be considered part of the entire written description of this invention. The drawings are not necessarily to scale, and certain features of the invention may be shown exaggerated in scale or in somewhat schematic form in the interest of clarity and conciseness.

Figure 1:
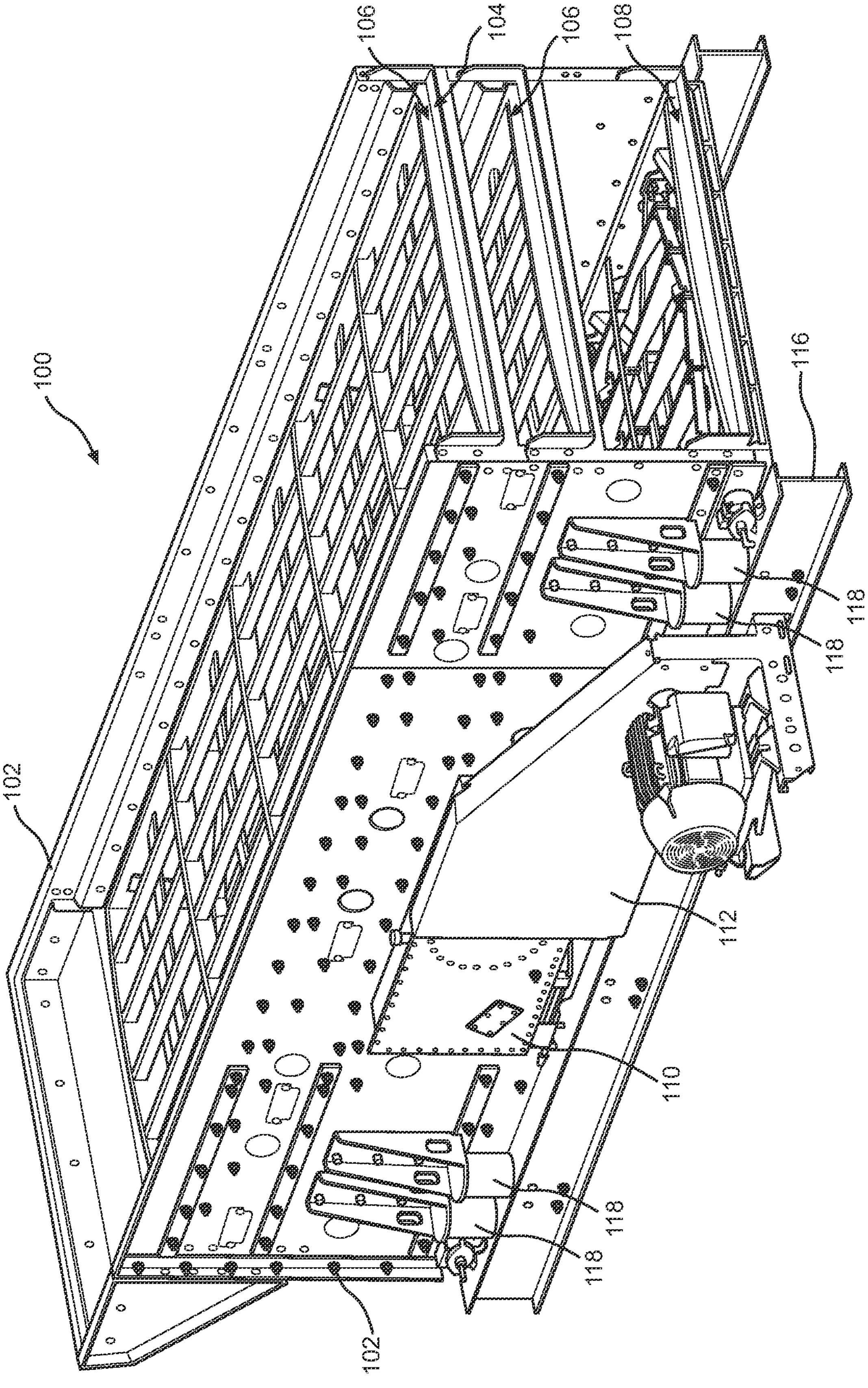
FIG. 1 is a perspective view of a vibratory screen assembly having a plurality of screen decks that includes a screen according to the present disclosure installed in a lowest position.
Figure 2A:
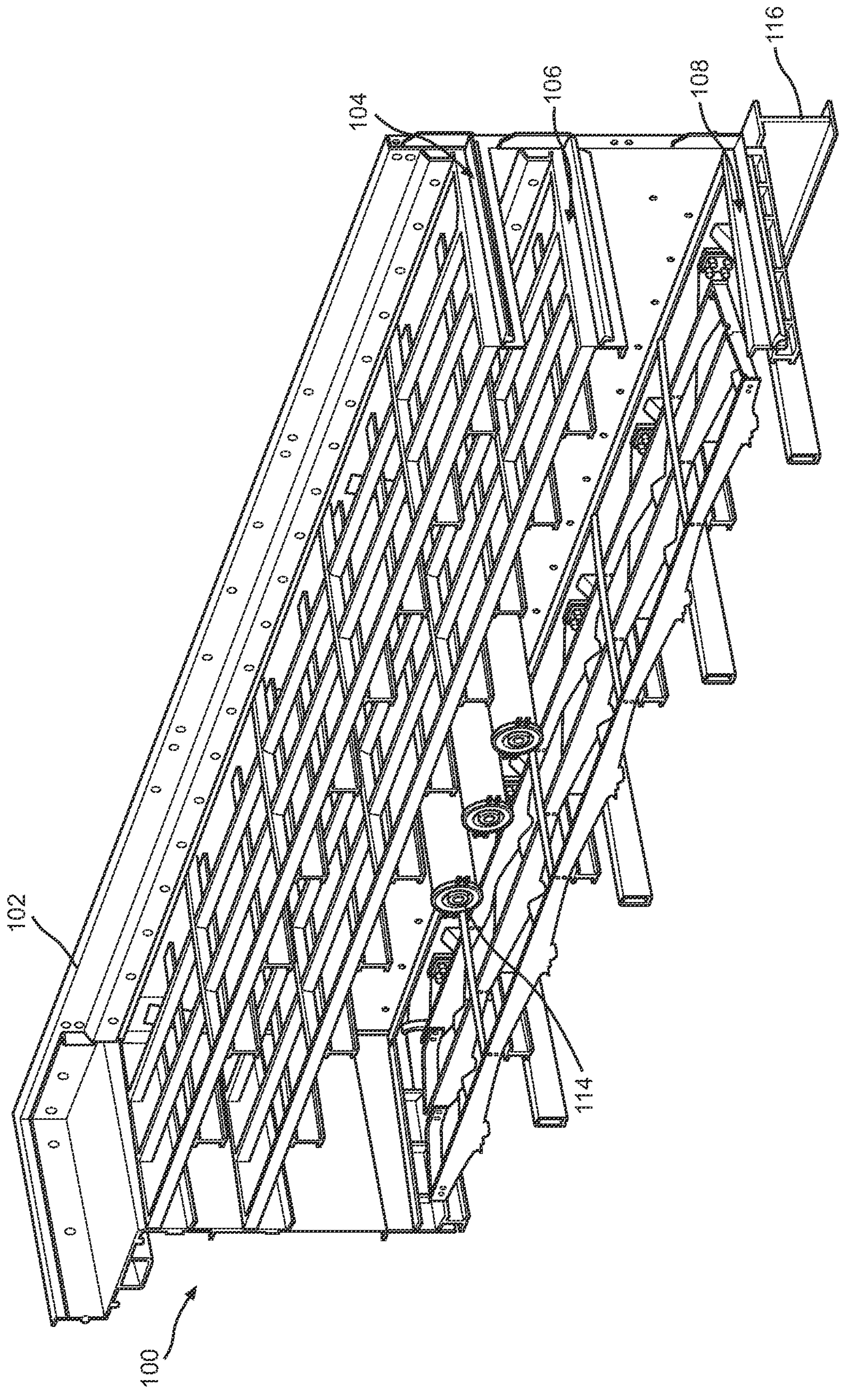
FIG. 2A is a cutaway view along a longitudinal direction of the vibratory screen assembly of FIG. 1.
Figure 2B:
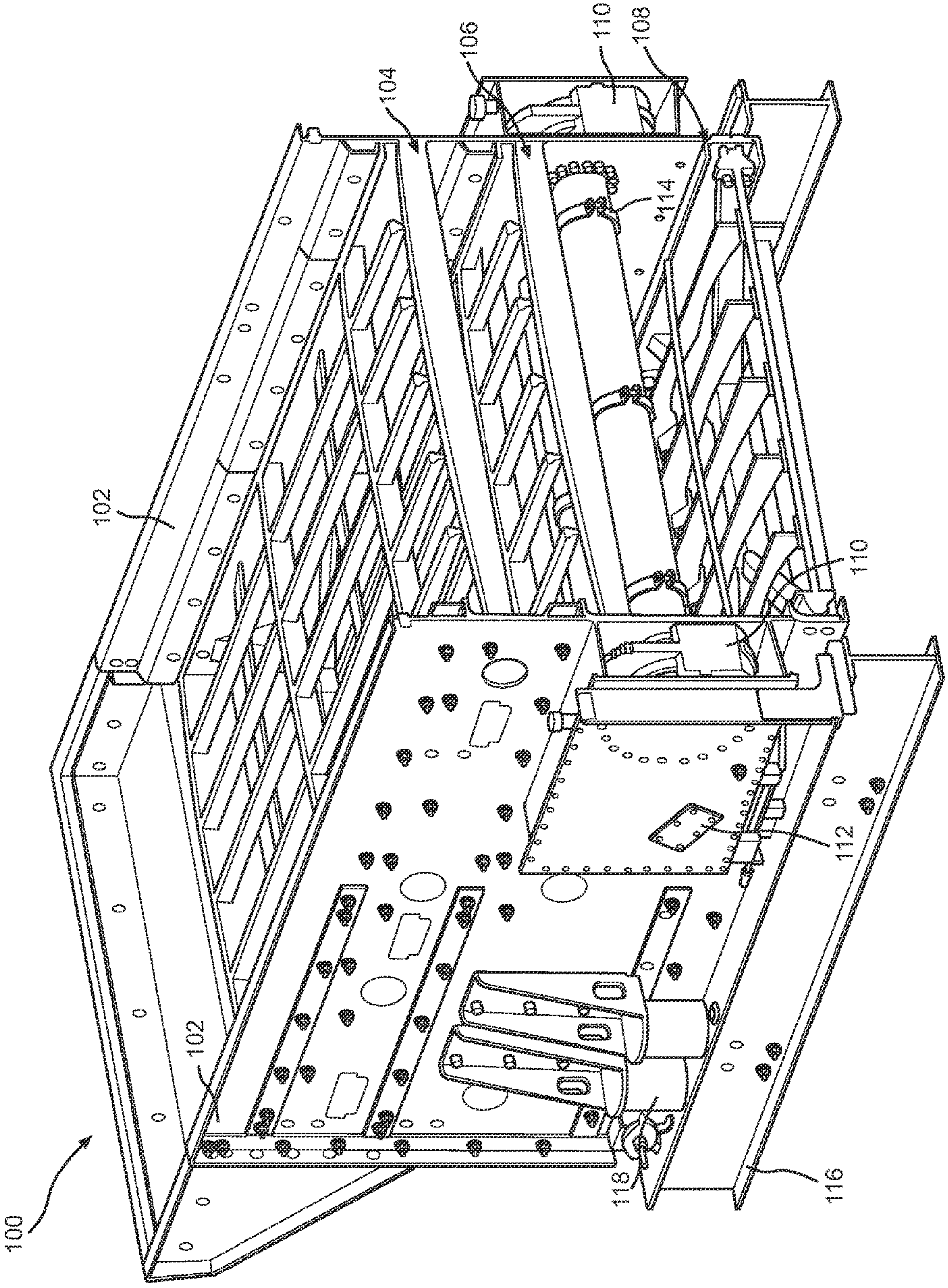
FIG. 2B is a cutaway view in a direction perpendicular to the longitudinal direction of the vibratory screen assembly of FIG. 1.

Referring now to the drawings and, more particularly to FIGS. 1-2B, there is shown a vibratory screen assembly 100 according to an embodiment of the present disclosure. Assembly 100 is provided with several screen decks that are each mounted between side plates 102, including a first screen deck 104 that is mounted in an upper position and a second screen deck 106 that is mounted in a lower position. In certain preferred embodiments, one or more additional screen decks, such as third screen deck 108, may be mounted lower than the second screen deck 106. In certain embodiments, the screen decks 104, 106, 108 are all the same style. However, in other embodiments, providing screen decks 104, 106, 108 of different styles may be beneficial. For example, in the illustrated embodiment, first screen deck 104 and second screen deck 106 are the same style and are representative of conventional screen decks. However, as described below, the third screen deck 108 is a different and new style of screen that offers several advantages over conventional screens. The side plates 102 are each preferably equipped with a vibration generator 110 such as a rotating eccentric mass or the like, for imparting vibrations to the assembly 100 or a portion thereof. In certain embodiments, the vibration generator 110 is disposed beneath a protective housing 112, which may be mounted to side plate 102. In certain embodiments, the vibration generator 110 is attached to one or more shaft tubes 114 to translate vibrations more directly to the screen decks 104, 106, 108. In preferred embodiments, the side plates 102 are each supported on a rigid grounding support 116 by compliant elements 118.

Figure 3:
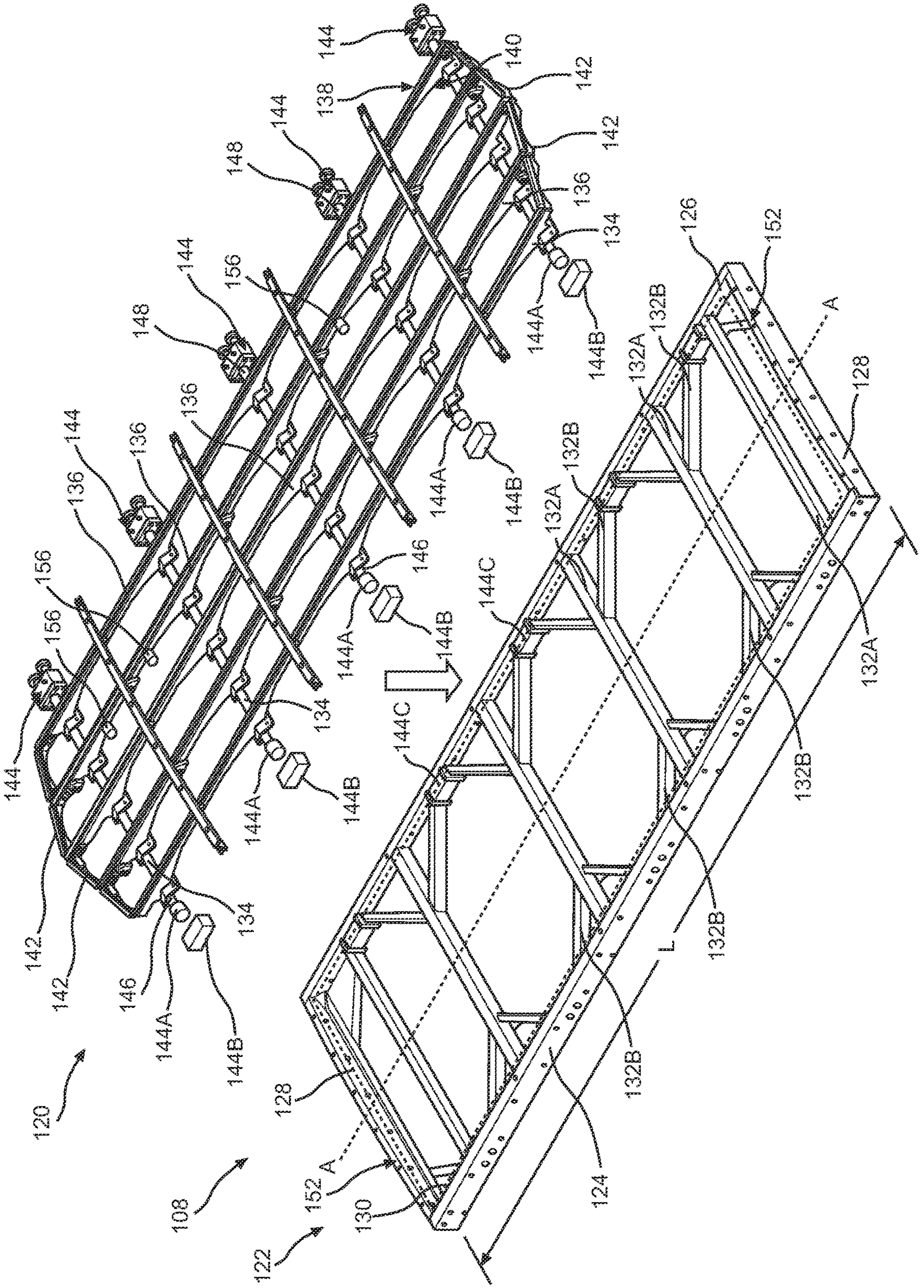
FIG. 3 is an exploded perspective view illustrating a flexible portion and a rigid portion of a screen deck according to certain embodiments of the present disclosure.
Figure 4:
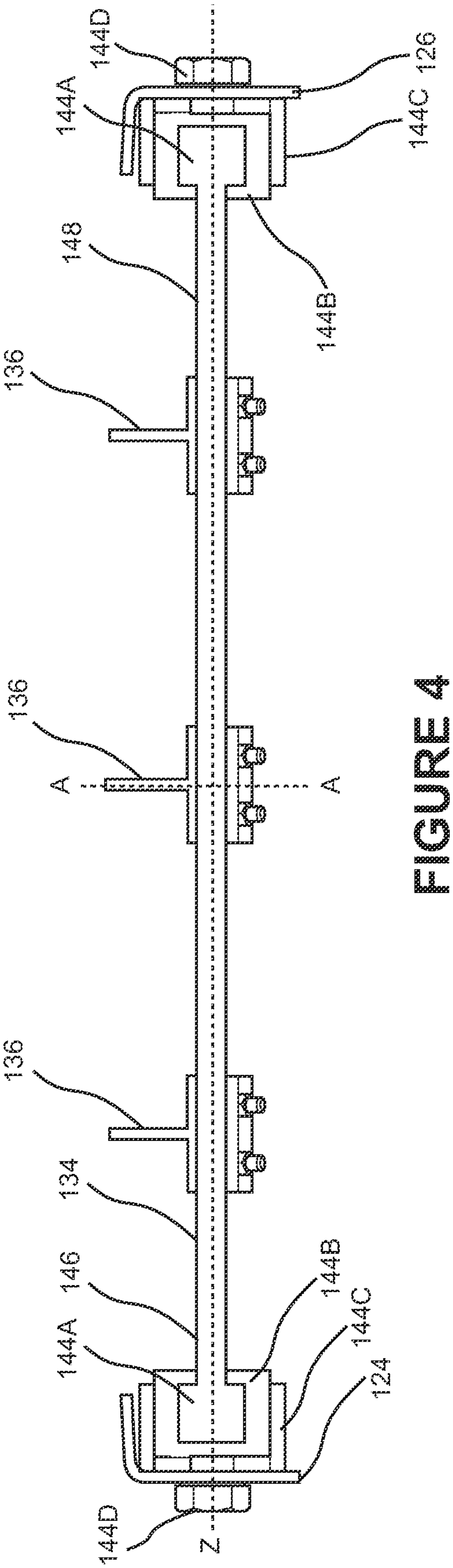
FIG. 4 is a cutaway view along a flexible girder of a screen deck according to an embodiment of the present disclosure.
Figure 5:
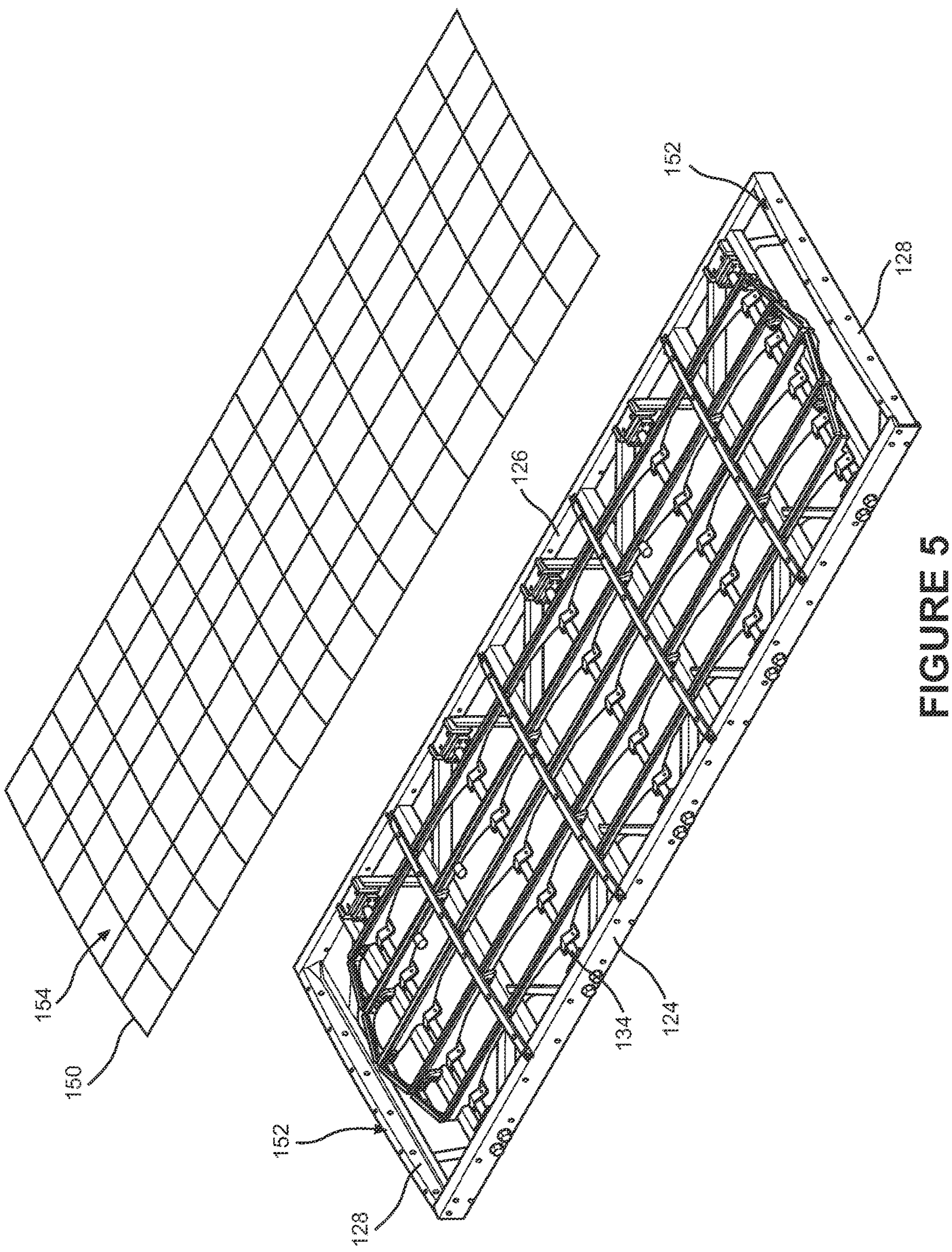
FIG. 5 is a perspective view of the screen deck of FIG. 3, where the flexible portion is mounted to the rigid portion.
Figure 6:
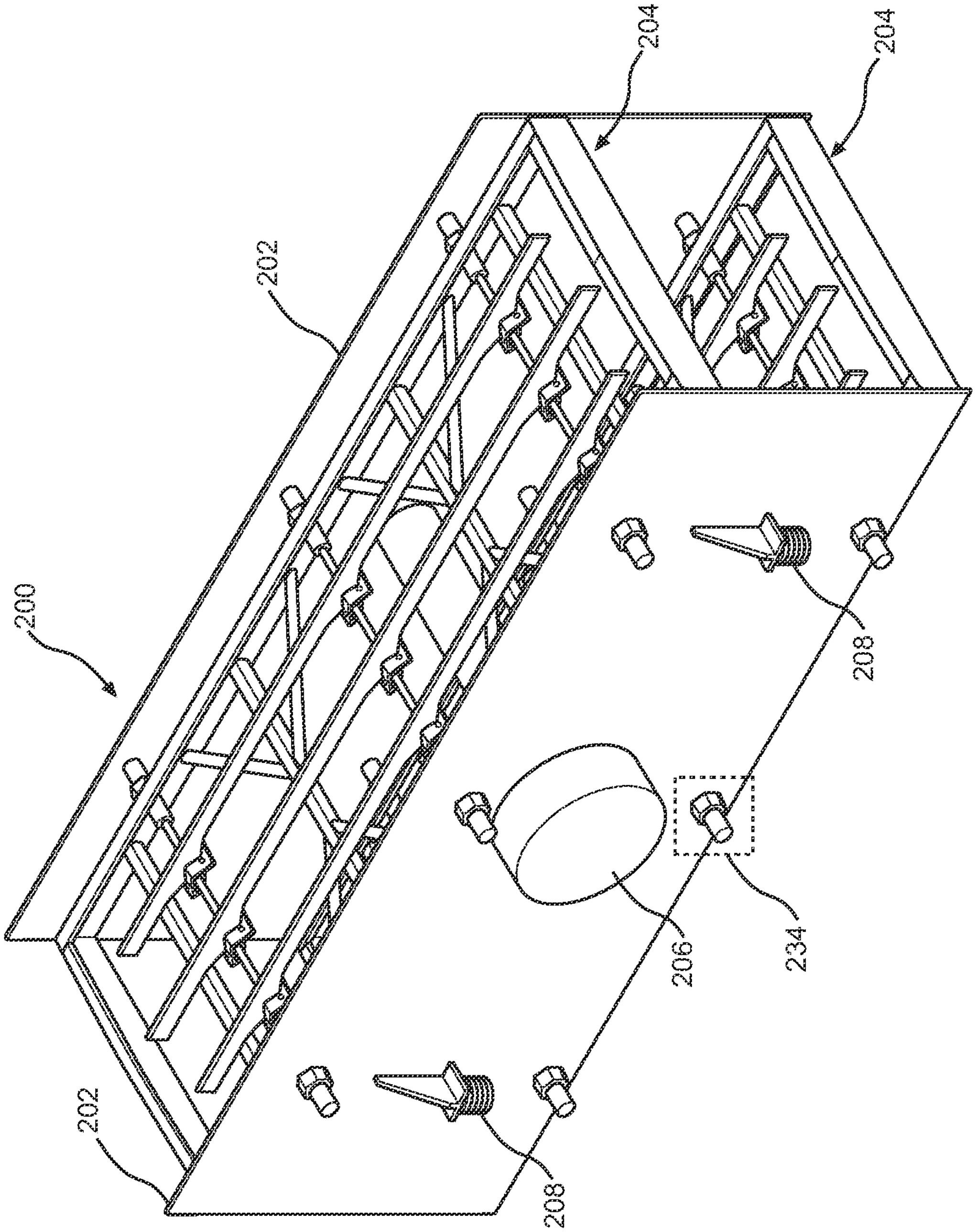
FIG. 6 is a perspective view of a vibratory screen assembly having screen decks according to an embodiment of the present disclosure installed in upper and lower positions.
Figure 7:
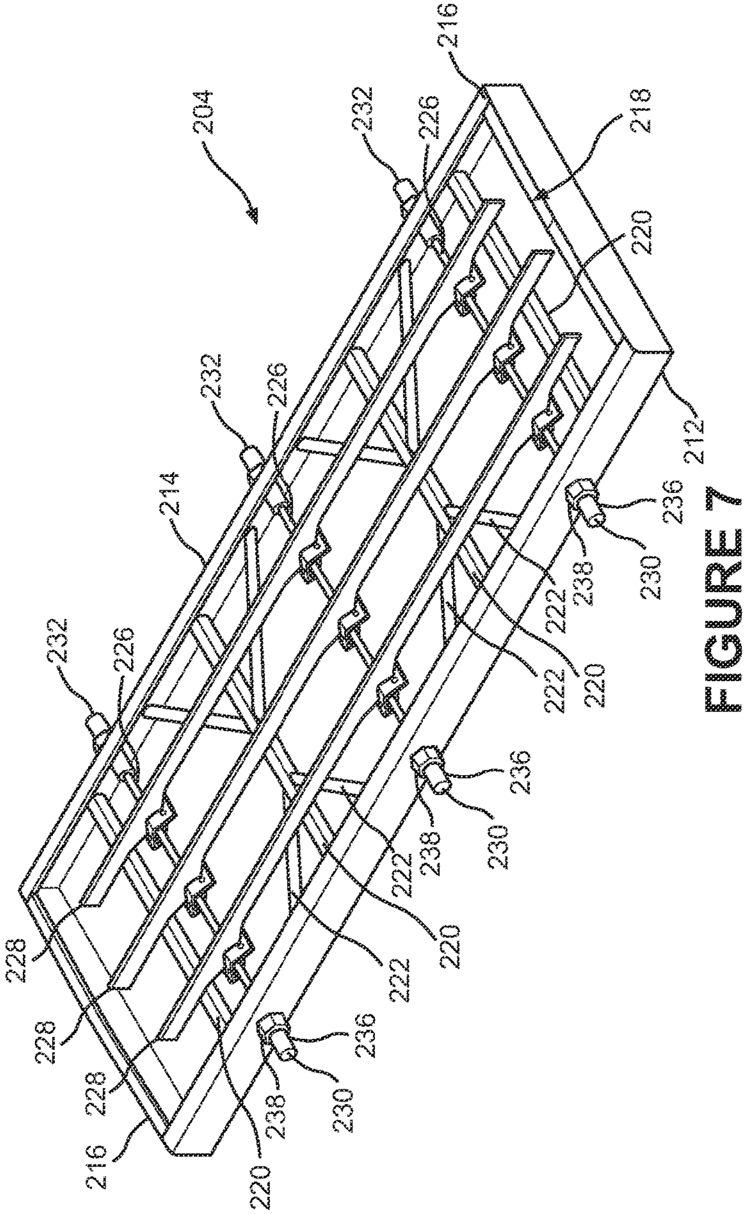
FIG. 7 is a perspective view of a single screen deck of the vibratory screen assembly of FIG. 6.
Figure 8:
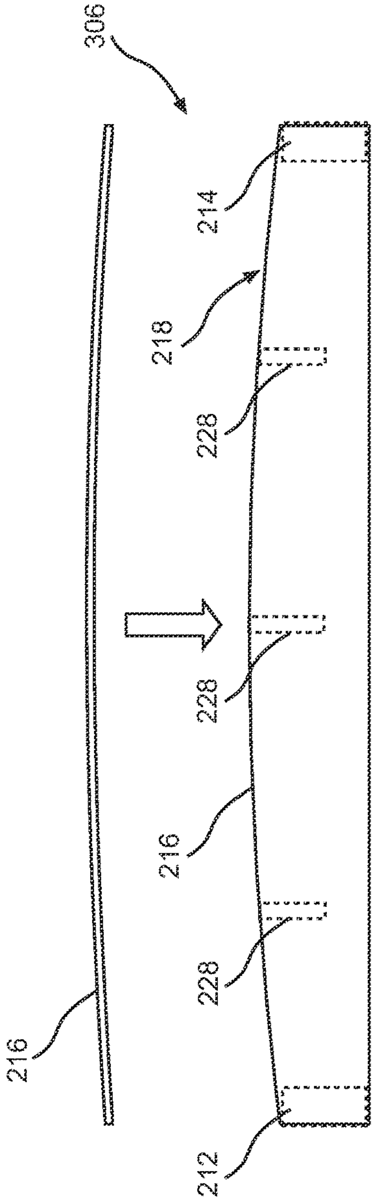
FIG. 8 is an exploded end view of the screen deck of FIG. 7 illustrating a deck end having an arched upper face and also depicting a screen medium positioned above the screen deck.
Figure 9:
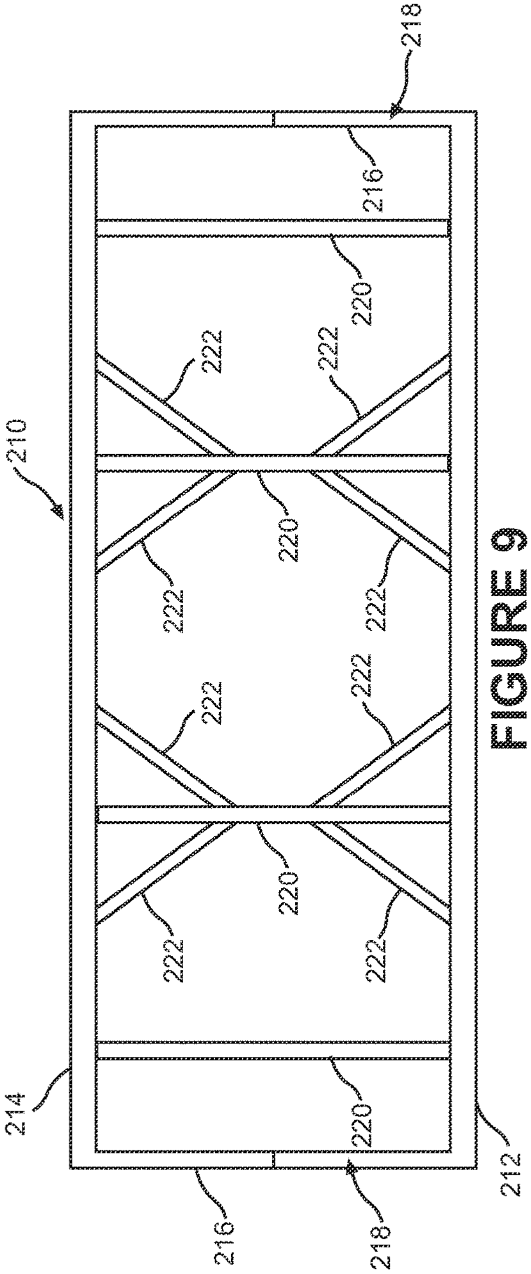
FIG. 9 is a top plan view of a rigid portion of one of the decks of FIG. 6 with only deck sides and deck stability members being shown.
Figure 10:
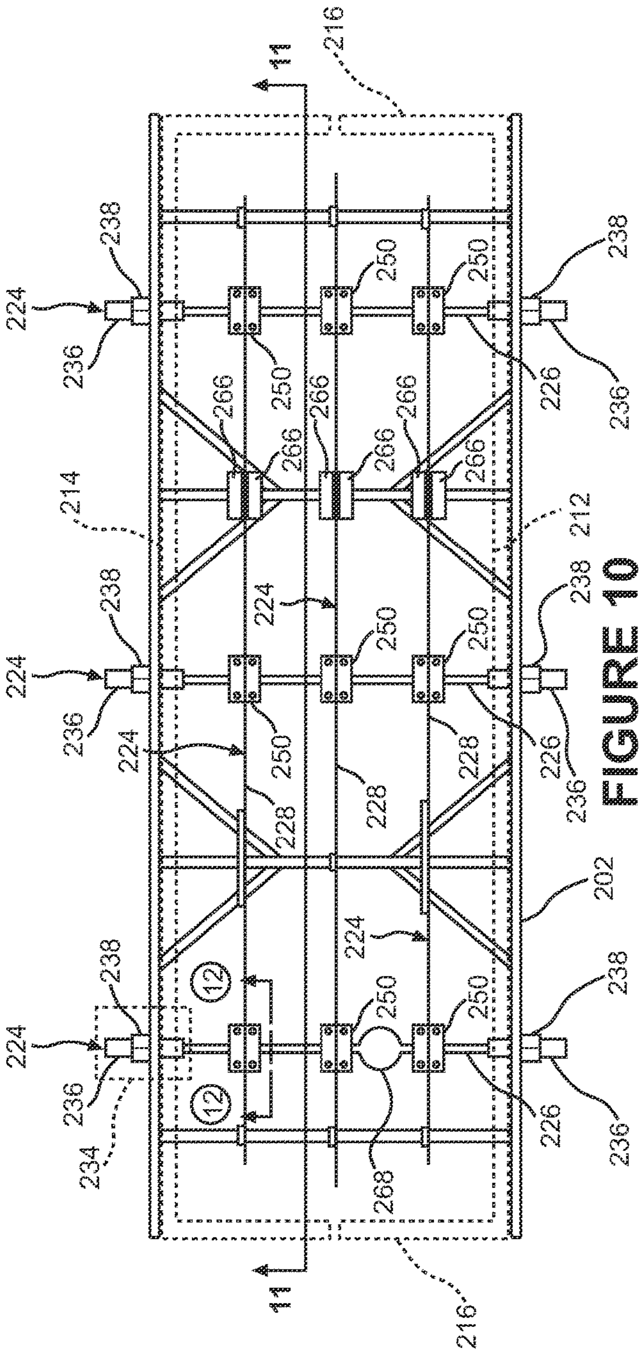
FIG. 10 is a top plan view of the screen deck of FIG. 6 including beaters and having media support members, flexible girders, and clamps along with deck sides, stability members, and deck ends (shown in dashed lines) configured for use in a deck for a vibratory screen assembly according to an embodiment of the present disclosure.
Figure 11:
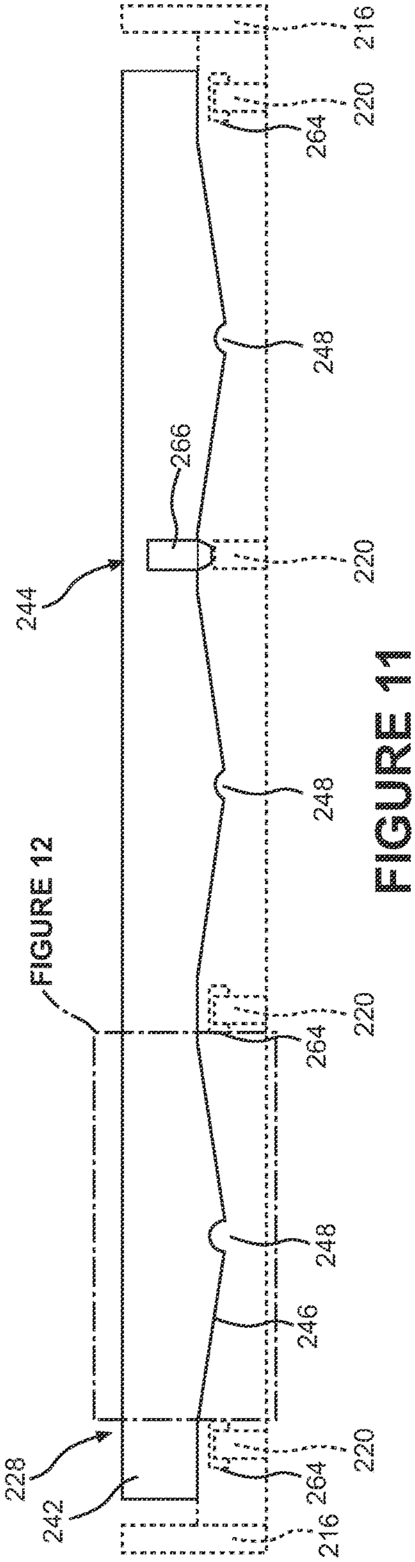
FIG. 11 is a sectional view taken along line 11-11 of FIG. 10 that depicts a media support member and also depicts a deck side, deck stability members and opposing deck ends (each shown in dashed lines)
Figure 12:
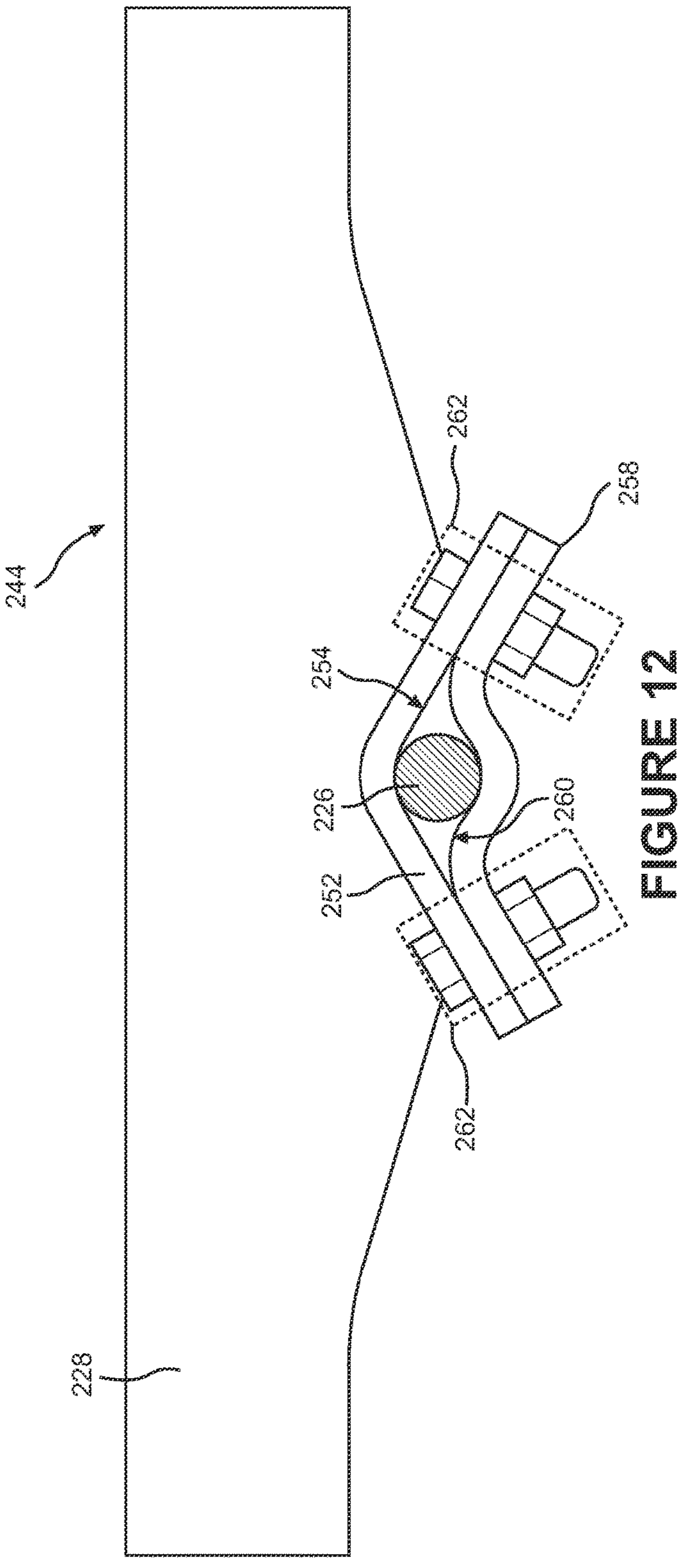
FIG. 12 is a detail view of a portion of the media support member shown in FIG. 11 and labeled "FIG. 12" that also depicts a clamp and flexible girder mounted to the media support member.

Turning now to FIGS. 3-5, screen deck 108 includes a flexible portion 120 that is joined to and works cooperatively with rigid portion 122. The rigid portion 122 includes a first deck side 124, a second deck side 126, and deck ends 128 connecting ends of the first and second deck sides together. The first deck side 124 and the second deck side 126 are disposed parallel to each other along a longitudinal length L of the screen deck 108. The deck ends 128 are disposed at ends of the rigid portion 122 and their opposing ends connect to the first deck side 124 and second deck side 126 together. The first and second deck sides 124, 126 and deck ends 128 define an open screening space (generally denoted by dashed line 130). First stability members 132A extend across the screening space 130 along length L and provide rigid support for the flexible portion 120 within the screening space. The first stability members 132A also maintain the deck sides 124, 126 in a spaced apart configuration. Preferably, the deck ends 128 are formed as a flat plate. Meanwhile, the first stability members 132A are preferably formed using tube stock, such as rectangular tube steel.

In the illustrated embodiment, second stability members 132B are disposed diagonal to the first stability members 132A. Each first stability member 132A is preferably oriented normal to the plane of the deck sides 124, 126 and each of the second stability members 132B are preferably mounted to an inward-facing surface of one of the deck sides and a first stability member. In certain embodiments, the first stability members 132A are spaced at regular intervals along the deck sides 124, 126. In other embodiments, the first stability members 132A are spaced at non-regular intervals.

The flexible portion 120 is disposed within the rigid portion 122 and generally, within screening space 130. The flexible portion 120 is formed by one or more flexible girders 134 that flexibly support one or more rigid support members 136. Preferably, rigid support member 136 are exclusively supported by flexible members, such as flexible girders 134, so that the rigid support members are each able to move freely up and down within the screening space 130 while supported by the flexible members.

Flexible girders 134 preferably extend across the screening space 130 normal to the plane of the deck sides 124, 126, whereas support members 136 preferably extend across the screening space parallel with the deck sides. The flexible girders 134 extend between the first and second deck sides 124, 126, are secured to the deck sides, and are each configured to be selectively tensioned and loosened. In preferred embodiments, the flexible girders 134 are made from a material that may be selectively and repeatedly tensioned and un-tensioned, including wire rope as well as solid steel. Preferably, the flexible girder 134 has a relatively low bending stiffness unless and until tensioned between the deck sides 124, 126. In the illustrated embodiment, support members 136 are each formed as a single and continuous thin bar that has a continuous and flat top surface 138 and a substantially continuous and flat bottom surface 140 but that has an increased height at certain locations along its length to provide additional support for connecting to and supporting the flexible girders 134. Preferably, each support member 136 can move substantially independently of each other support member. However, opposing ends of the support members 136 may be joined to an adjacent support member by a connecting rod 142. Preferably, connecting rod 142 maintains a desired amount of space between each adjacent support member 136 while still enabling at least some degree of relative upward and downward motion between them.

In preferred embodiments, each flexible girder 134 is selectively tensioned using one or more cooperative sets of tensioning components, the set forming a tensioner 144. To tension the flexible girder 134, at least one end of the flexible girder is moved along axis Z away from center-line AA using the tensioner 144. Conversely, tension in the flexible girder 134 is reduced by moving ends of the flexible girder 134 towards center-line AA along axis Z. In the illustrated embodiment, tensioner 144 is formed by a first component 144A placed at a first end 146 and/or a second end 148 of each of the flexible girders 134, a second component 144B designed to encapsulate and secure the first component while facilitating motion along axis Z, and a corresponding third component 144C that is mounted on the rigid portion 122. In this case, the first component 144A is a button swaged to the flexible girder 134. Meanwhile, the second component 144B is a tension block 144B that receives and encapsulates the swaged button 144A to facilitate motion along axis Z. The third component 144C is a receiver for limiting the motion of the tension block 144B to the axis Z. Bolts 144D abutting the exterior surface of the deck sides 124, 126 are provided to thread into the tension block 144B and move the tension block along axis Z while the tenson block is contained within receiver 144C. Bolts 144D act as securing points for the flexible girder 134. In certain embodiments, the ends 146, 148 of the flexible girders 134 may be moved along the axis Z using other means, such as hydraulic pistons, air bags, springs, etc., resulting in varying amount of tension in the flexible girder 134.

After the flexible portion 120 is mounted to the rigid portion 122 within the screening space 130, a screen medium 150 is placed over the screen deck 108 and mounted to the sides 124, 126 and opposing deck ends 128 (although screen media is present on all screen decks, it is omitted for clarity in figures other than FIG. 4). Preferably, each of the deck ends 128 has an arched upper face 152 that is configured to be placed immediately below and to support the screen medium 150. Preferably, the tallest portion of the upper face 152 is located at the center of each deck end 128 and the shortest portion of the upper face is located adjacent an inside surface of each of the deck sides 124, 126. Thus, because of the arched upper face 152, at least the ends of the screen medium 150 are always arched in shape, even if the flexible girders 134 are flexing and are not arched. This arched shape will tend to cause particles disposed on the screen medium 150 to move towards the deck sides 124, 126. In the illustrated embodiment, screen medium 150 is provided with a plurality of openings 154 that may be square shaped or that may be other shapes known in the art or that are desirable for providing selected screening characteristics or benefits, including diamond, rectangular, circular, triangular, etc. Each support member 136 has a top surface 138 that is placed directly below and that, preferably, directly supports the screen medium 150. The top surface 138 is preferably coplanar with the upper face 152 of the deck end 128, particularly when no bulk material is present on the screen deck 108. However, in certain embodiments, the top surface 138 is only coplanar with one deck end 128.

In operation, a bulk material is provided to the vibratory screen assembly 100 shown in FIG. 1 via a conveyor, a hopper, a dump truck, an excavator, a skid steer loader, or other appropriate bulk material-delivery device, and is placed onto first screen deck 104. As the assembly 100 is vibrated via the vibration generator 110, vibration occurs at a uniform, linear frequency and is translated to each of the screen decks 104, 106, 108. The bulk material generally consists of an aggregate of individual particles having individual sizes, for example, the bulk material may be various-sized rocks, a gravel/sand mixture, pieces of concrete, etc. As the assembly 100 vibrates, the vibrations are translated to the bulk material present on the first screen deck 104 and bulk material under a certain size passes through the screen on the first screen deck and lands on the second screen deck 106. The second screen deck 106 typically includes a screen with smaller openings than the openings of the first screen deck 104. This results in further stratification and filtration of the bulk material with the larger material remaining on the second screen deck 106 and the smaller material falling to the third screen deck 108, where it is further sorted.

In certain embodiments, all screen decks 104, 106, 108 may be like that of screen deck 108. In those embodiments, as the bulk material is placed on the screen deck 108, the impact creates a non-linear impact force within the screen deck. Because the screen is supported on the flexible girders 134, the impact force is captured and translated throughout the screen deck 108, causing a non-linear vibration. This in-turn creates advantageous motion of the media (or "media action") which promotes uniform filtration and discourages clogging (or "blinding") of the screen. Further, providing different tension in each of the various flexible girders 134 also allows the media action and the resonant frequencies to be tuned at various points along the screen deck 108.

A vibratory screen assembly 100 according to embodiments of the present disclosure simultaneously provides the benefits of both a rigid vibratory screen assembly as well as a flexible one. In particular, the vibratory screen assembly 100 provides rigidity against internal tension forces generated by tensioning the flexible girders 134. Consequently, when in use, the screen deck 108 experiences minimal to no flexing; rather, the deck is held quite rigid. At the same time, by arranging the support members 136 and the screen medium 150 on the flexible girders 134, the screen medium is permitted to provide favorable media action to any bulk material present on the screen deck 108.

The vibratory screen assembly 100 can provide multitude normal modes of vibration, depending on the presence and amount of tension in each of the flexible girders 134. Varying vibratory excitation also influences the mode of vibration. In one example, excitation is caused by a non-linear impulse force, such as that produced by the impact of the bulk material on the screen deck 108. When media support members 136 are mounted on flexible girders 134, the non-linear impulse forces allow for the natural modes to become excited even when the structure is excited by a linear vibration at a non-resonant frequency.

Accordingly, the vibratory screen assembly 100 provides a screen deck 108 that transmits single-frequency linear vibration from the vibratory screen assembly to the screen medium 150 and converts non-linear force from the bulk material and linear vibrational energy from the vibration generator 110 to vibrational energy at the natural frequencies of the screen deck. This results in a highly energetic media action having a vibration preferably composed of multiple frequencies throughout the span of the screen deck 108, except for where the screen medium is fixed to the deck sides 124, 126 and deck ends 128.

Importantly, to excite a variety of modes of vibration that are each at a different frequency, periodic non-linear forces may be provided. As noted previously, an example of such a periodic non-linear force is the force caused by the impact of bulk material on the screen deck 108. This non-linear force is harnessed to create productive vibration when the screen deck 108 is designed to have one or more productive normal modes of vibration. Unlike the system of the present disclosure, conventional screen decks are designed to be substantially rigid and, thus, are not suitably equipped to convert periodic non-linear force into useful vibration energy.

In addition to the bulk material impact scenario discussed above, non-linear forces may be introduced to the screen deck in other ways. In certain embodiments, high-frequency exciters 156 impart specific vibration modes on the flexible portion 120. For example, exciters 156 may be coupled to media support members 136 or along the flexible girder 134. The vibration frequency of the exciters can be adjusted to induce a desirable vibration frequency along various points on the screen deck 108.

An advantage of screen deck 108 is that such a deck transmits vibration across the screen deck since the entire flexible portion 120 of the screen deck is interconnected. Additionally, since the flexible portion 120 of the screen deck 108 is resiliently coupled together with the rigid portion 122, viscoelastic isolators that are conventionally placed between the shaft tubes 114 and side plates 102 may be eliminated, reducing wear parts, and required maintenance. Further, screen deck 108 provides normal modes whose frequencies can be adjusted by tightening or loosening the tension of the flexible girders 134. This, in turn, allows the response from the exciters 156 to be amplified by resonance without the need for variable speed exciters since the natural frequency of the flexible portion 120 could, itself, be adjusted.

Turning now to FIGS. 6-13B, an alternative embodiment of a vibratory screen assembly 200 is shown. The assembly 200 includes a pair of side plates 202, and at least one screen deck 204. Although multiple screen decks 204 are shown, an assembly with a single screen deck is contemplated. The assembly 200 further includes a vibration generator 206 and compliant elements 208, which attach to a grounding support (omitted for clarity). The screen deck 204 comprises a rigid portion 210 including deck sides 212, 214 and deck ends 216. In certain embodiments, the deck ends 216 are constructed from a flat plate of metal or other suitable material (e.g., tube steel). Preferably the deck ends 216 include a top surface 218, the top surface being arched upward with the highest point being at the center of the arch. The rigid portion 210 further includes first stability members 220 disposed perpendicular to and connecting the deck sides 212, 214. A second stability member 222 may also be diagonally connected between the first stability member 220 and the deck side 212, 214.

Figure 13A:
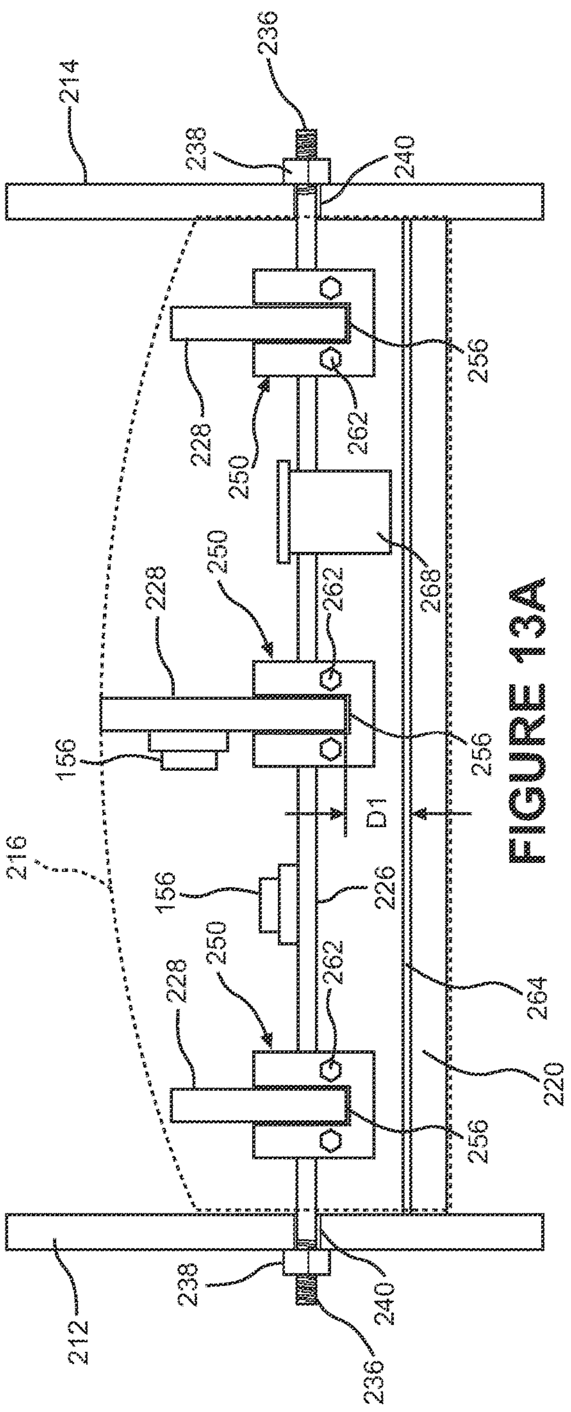
FIG. 13A is a cross sectional view depicting an end view of media support members, flexible girders, clamps, deck sides, and stability members according to an embodiment of the present disclosure, wherein the flexible girder is experiencing no deflection.
Figure 13B:
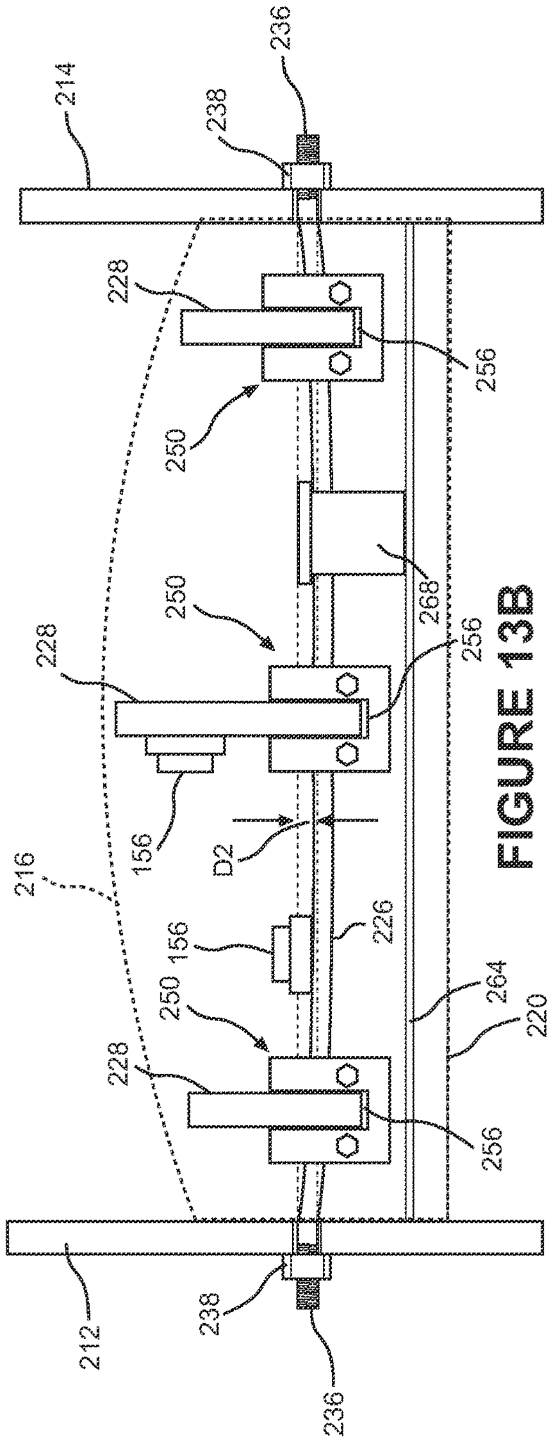
FIG. 13B is a cross sectional view similar to FIG. 13A where the flexible girder is shown while experiencing exaggerated deflection.

The screen deck 204 also includes a flexible portion 224 including at least one flexible girder 226 and a support member 228. The flexible girder 226 includes a first end 230 and a second end 232, with a tensioner 234 disposed at either the first end, the second end, or both. In certain embodiments, the tensioner 234 comprises a threaded portion 236 at the first end 230 and a corresponding nut 238. As shown in FIGS. 13A and 13B, the deck side 212 includes a series of holes 240. In the figures, only two such holes 240 are shown, but similar holes are preferably provided for each flexible girder 226. Preferably, each of these holes 240 allows the first end 230 or second end 232 of the flexible girder 226 and the corresponding threaded portion 236 to pass through one of the deck sides 212 or 214. The nut 238 is then placed on the threaded portion and as the nut is tightened and abuts the outer surface of deck side 212, the tension in the flexible girder 226 increases. Additionally, there are many other suitable tensioners 234 known in the art. In certain embodiments, at least one side plate 202 also includes a set of holes, corresponding, preferably in number and position, to the holes 240 in the deck side 212, 214. The first end 230 or second end 232 of the flexible girdle 226 may be passed through both aligned holes and the nut 238 may then be placed on the threaded portion to abut the outer surface of side plate 202. This facilitates tension adjustments from the exterior of the vibratory screen assembly 200. The tensioners 234 of the flexible girders 226 may be adjusted independent from one another or adjusted simultaneously, which allows different girders to be selectively provided with differing amounts of tension.

The flexible portion 224 also includes the support member 228 that is fixedly attached to the flexible girders 226. In certain embodiments, the support member 228 includes an upper portion 242 having a top surface 244 that contacts and provides support for the screen medium. The support member 228 further has a lower portion 246 including a notch 248 that is sized and configured to be placed over the flexible girder 226 such that the flexible girder is held within the notch. To affix the support member 228 to the flexible girder 226, a saddle or clamp 250 may be provided. The clamp 250, may comprise a top portion 252 fixedly attached to the support member 228, such as by welding, and including a lower surface 254 having a portion that approximates the size and shape of at least a portion of the notch 248. When assembled, the lower surface 254 contacts the flexible girder 226. In certain embodiments, the top portion 252 includes a central slot 256 to locate the support member 228 within the top portion. Surrounding at least a portion of the support member 228 with the top portion 252 provides a studier connection between the support member and the clamp 250, thereby providing a studier connection between the clamp and the flexible girder 226. The clamp 250 also includes a bottom portion 258 that selectively attaches to and works cooperatively with the top portion 252 to receive and securely hold the flexible girder 226 within the clamp 250. In the illustrated embodiment, the bottom portion 258 includes an upper surface 260 that also approximates the size and shape of at least a portion of the notch 248. In certain embodiments, at least the lower surface 254 of the top portion 252 is an inverted V-shape and at least the upper surface 260 of the bottom portion 258 is an M-shape that is sized to nest within the top portion. The top portion 252 and the bottom portion 258 are preferably removably or fixedly secured together by an appropriate fastener 262 (e.g., nut and bolt, welding, screw, rivet, etc.). In the embodiment shown and described above, the top portion 252 is fixedly attached to the support member 228 and the bottom portion 258 is free (i.e., not attached to the support member). However, in other embodiments, the bottom portion 258 may be attached to the support member and the top portion may be free.

In certain embodiments, multiple support members 228 are provided. Like when a single support member 228 is provided, when multiple support members are provided, the top surface 244 of each support member is preferably coplanar with the top surface 218 of the deck end 216 when no bulk material is present on the screen deck 204. In certain embodiments, the bottom of support members 228 are offset from the top of stability members 220, 222 by a distance D1. When a load is introduced to the screen deck 204, typically in the form of bulk material, the flexible girder 226 deflects downward by a maximum distance D2. In addition to the force of impact of bulk material on the screen deck 204 discussed above, non-linear forces may also be introduced to the screen deck 204 by facilitating an interaction between the support member 228 and the stability members 220, 222. For example, if the offset distance D1 is less than the maximum deflection distance D2 of the flexible girder 226, when the flexible girder experiences its maximum deflection, a collision could occur between the support member 228 and the stability members 220, 222 generating a periodic non-linear impulse. Elastomer elements 264 may be used to extend the life of the colliding members and to focus the range of excited frequencies. In certain embodiments, elastomer elements 264 may be disposed on the stability members 220, 222. Elastomer elements 264 may also be used to adjust the natural frequencies of the flexible portion 224. In certain embodiments, elastomer elements 266 are attached to the support members 228 and have a height equal to D1, meaning the elastomer elements entirely fill the gap between support members and stability members 220. Various durometer elastomer elements 264, 266 can be used to alter the vibratory response of the screen deck 204.

In certain embodiments, a beater 268 may be attached to the flexible portion 224 of the screen deck 204. The beaters 268 would provide periodic impulses to the flexible portion 224, which would excite a range of natural modes of vibration contained in the screen deck 204.

Figure 14:
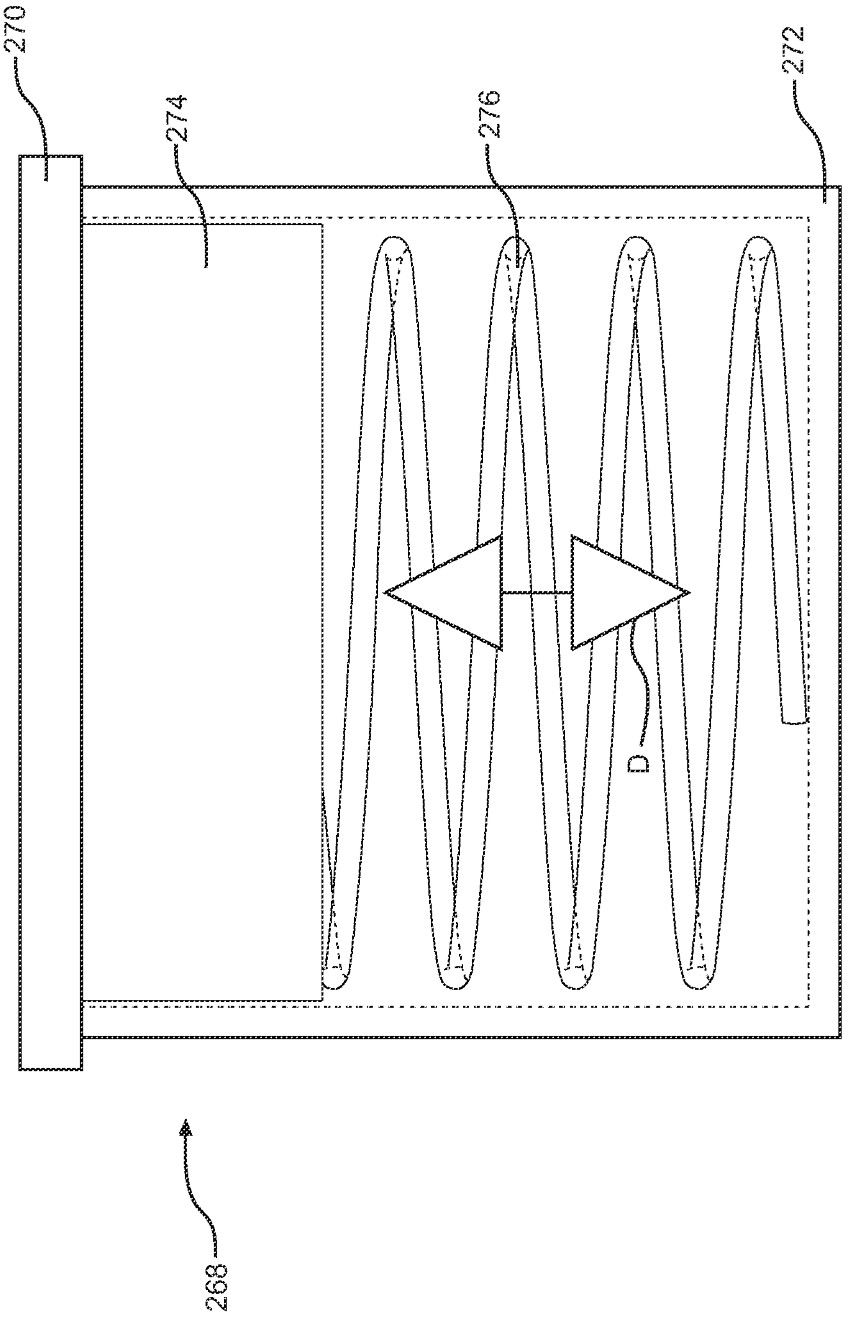
FIG. 14 is a cutaway view of a beater according to an embodiment of the present disclosure.

Now with additional reference to FIG. 14, a beater 268 according to an embodiment of the present invention is shown. The beater generally consists of a lid 270, a hollow body 272, a mass 274, and a spring 276. The mass 274 is disposed within the hollow body and can generally move vertically within the hollow body in direction D. The spring 276 supports the mass 274 and delivers an upward force on the mass as the mass moves in direction D. Various masses and springs can be utilized to tune the impulse delivered to the screen deck 204 via the beater 268. The beater 268 may be attached to the flexible portion 224 either by external attachment, i.e., welded or bolted, or formed in a portion of the flexible portion 224. For example, lid 270 may be formed as an integral part of the flexible girder 226.

Although this description contains many specifics, these should not be construed as limiting the scope of the disclosure but as merely providing illustrations of some of the presently preferred embodiments thereof, as well as the best mode contemplated by the inventor of carrying out the inventions of this disclosure. The inventions of this disclosure, as described herein, are susceptible to various modifications and adaptations as would be appreciated by those having ordinary skill in the art to which the disclosure relates.

What is claimed is:

1. An apparatus for providing selectable multimodal vibration in a vibratory screen assembly having first and second side plates that are held in an offset parallel arrangement extending in a longitudinal direction, the apparatus comprising:

a screen deck connecting the first and second side plates together and formed by:

first and second deck sides that are held in an offset parallel arrangement extending in the longitudinal direction;

first and second deck ends connecting opposing ends of each of the first and second deck sides together; and first stability members connecting the first and second deck sides together and spaced along the screen deck between the deck ends, wherein a screening space is defined by the first and second deck sides and the deck ends of the screen deck;

flexible girders extending between the deck sides and configured to be secured to first and second deck sides and further configured to be selectively tensioned and un-tensioned;

support members extending in the longitudinal direction and attached to the flexible girders; and a screen medium extending over a top of the screen deck to cover the screening space and having a bottom surface that is supported by a top of the support members.

2. The apparatus of claim 1 wherein the top surface of the first and the second deck ends each form an arch wherein a top of the arch corresponds with a center of the respective deck ends, and wherein the top of the support members is level with a top surface of at least one of the first and second deck ends.

3. The apparatus of claim 1 further comprising a tensioner for selectively tensioning the flexible girders, and wherein the tensioner comprises a first component and a second component, and wherein the first component is disposed on an end of the flexible girder.

4. The apparatus of claim 3 wherein each flexible girder is tensioned at a different tension level.

5. The apparatus of claim 3 wherein the first component of the tensioner is a swaged button, and the second component is a tension block, and wherein the tension block is sized and configured to capture the swaged button, and wherein the tension block is further configured to be movable perpendicular to the deck sides along a central axis of the flexible girder.

6. The apparatus of claim 3 wherein the first component of the tensioner is a threaded portion and the second component is a nut threaded onto the threaded portion, the nut being sized and configured to abut an exterior surface of the deck sides, and wherein as the nut of the tensioner is tightened, tension is applied to a portion of the flexible girder disposed between the first and second deck sides.

7. The apparatus of claim 6 wherein the flexible girder comprises metal wire rope.

8. The apparatus of claim 1 wherein the support member comprises an upper section for supporting the screen medium and a lower section for engaging with the flexible girder, wherein the lower section includes a notch sized and configured to be placed atop the flexible girder and locate the flexible girder within the notch, and wherein the support member is fixedly attached to the flexible girder by a clamp, the clamp having:

a top portion affixed to the support member, the top portion having a lower surface that corresponds to the notch and contacts the flexible girder; and a bottom portion selectively attached to the top portion, the bottom portion having an upper surface sized and configured to contact and secure the flexible girder within the clamp when selectively attached to the top portion.

9. The apparatus of claim 8 wherein a bottom surface of the lower section is vertically offset from the support members by a distance D1, and wherein an elastomer having a height equal to D1 is disposed between the bottom surface of the lower section and the support member.

10. The apparatus of claim 8 further comprising exciters mounted to the support member, the flexible girder, or both, and wherein the exciters are configured to vibrate at a specific frequency and induce vibration in the screen deck.

11. The apparatus of claim 8 further comprising a beater configured to deliver a non-linear impact force to the screen deck, the beater comprising:

a substantially hollow body;

a mass disposed within the hollow body configured to move vertically within the hollow body; and a spring disposed within the hollow body arranged to deliver an upward force on the mass.

12. The apparatus of claim 8 wherein a bottom surface of the lower section is vertically offset from the support members by a distance D1, wherein a maximum deflection distance of the flexible girder is D2, wherein D2 is greater than D1, and wherein as the flexible girder deflects to distance D2, the bottom surface contacts the support member, thereby creating a non-linear impact force in the screen deck.

13. The apparatus of claim 12 wherein an elastomer is disposed at a point where the bottom surface contacts the support member.

14. The apparatus of claim 1 further comprising said vibratory screen assembly, the vibratory assembly having:

a vibration generator affixed to the first side plate and configured to impart vibrations on the screen deck assembly, and wherein the screen deck connects the first and second side plate.

15. The apparatus of claim 14 further comprising a tensioner for selectively tensioning the flexible girders, wherein the tensioner has a first component disposed on an end of the flexible girder and a second component; and a first hole disposed in the first side plate and a corresponding second hole disposed in the first deck side aligned with the first hole, and wherein the first end of the flexible girder passes through the first and the second hole, and wherein the tensioner is accessible from an exterior surface of the first side plate.

16. The apparatus of claim 14 wherein at least one end of each of the flexible girders is secured at a securing point located outside of the first or second side plates.

17. A method for separating bulk material according to size, the method comprising the steps of:

providing a bulk material comprising an aggregate of individual material, each individual material having a size;

providing a vibratory screen assembly for multimodal vibration, the vibratory screen assembly having:

a first side plate;

a second side plate at an offset distance from the first side plate and parallel to the first side plate in a longitudinal direction;

a vibration-generator affixed to the first side plate and configured to impart vibrations on the vibratory screen assembly; and a screen deck connecting the first and second side plates, the screen deck having:

first and second deck sides that are held in an offset parallel arrangement extending in the longitudinal direction;

first and second deck ends connecting opposing ends of each of the first and second deck sides together;

first stability members connecting the first and second deck sides together and spaced along the screen deck between the deck ends;

a screening space defined by the first and second deck sides and the deck ends of the screen deck;

flexible girders extending between the deck sides and configured to be secured to first and second deck sides and further configured to be selectively tensioned and un-tensioned;

support members extending in the longitudinal direction and attached to the flexible girders; and a screen medium extending over a top of the screen deck to cover the screening space and having a bottom surface that is supported by a top of the support members, and wherein a top surface of the support members contacts and supports a bottom side of the screen medium, wherein a top surface of the support members at the first end is level with a top surface of the first deck end, and inducing a vibration via the vibration-generator, thereby translating the vibration to the screen deck, resulting in multiple vibration frequencies being present within the screen deck at various locations on said screen deck;

placing the bulk material on the screen deck; and transferring the vibration frequencies present in the screen deck to the screen medium and the bulk material present, resulting in a first size bulk material remaining on the screen deck and a second, smaller size bulk material passing through the screen deck.

18. The method of claim 17 wherein the vibratory screen assembly further comprises a second screen deck disposed underneath the first screen deck, the second screen deck having a second screen medium affixed to a top side of the second screen deck, the second screen medium being sized to permit a second size bulk material to remain on the second screen deck and a third, smaller size bulk material to pass through the second screen deck as the vibratory screen assembly vibrates.

19. The method of claim 18 wherein the vibratory screen assembly further includes beaters configured to deliver a non-linear impact to the first screen deck and the second screen deck, and wherein the method further includes the step of delivering a non-linear impact to the vibratory screen assembly via the beater.

20. An apparatus for providing selectable multimodal vibration in a vibratory screen assembly having first and second side plates that are held in an offset parallel arrangement extending in a longitudinal direction, the apparatus comprising:

a screen deck connecting the first and second side plates together and formed by:

first and second deck sides that are held in an offset parallel arrangement extending in the longitudinal direction;

a deck end connecting opposing ends of each of the first and second deck sides together; and first stability members connecting the first and second deck sides together and spaced along the screen deck between the deck ends, wherein a screening space is defined by the first and second deck sides and the deck ends of the screen deck;

flexible girders extending between the deck sides and configured to be secured to first and second deck sides and further configured to be selectively tensioned and un-tensioned between the deck sides;

support members extending in the longitudinal direction and attached to the flexible girders; and a screen medium extending over a top of the screen deck to cover the screening space and having a bottom surface that is supported by a top of the support members.

* * * * *